United States Patent
Greenberger et al.

(10) Patent No.: US 10,595,161 B2
(45) Date of Patent: *Mar. 17, 2020

(54) ASSOCIATING MULTIPLE USER DEVICES WITH A SINGLE USER

(71) Applicant: INTERNATIONAL BUSINESS MACHINES CORPORATION, Armonk, NY (US)

(72) Inventors: Jeremy A. Greenberger, San Jose, CA (US); Ciaran E. Hannigan, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,497

(22) Filed: Mar. 18, 2019

(65) Prior Publication Data

US 2019/0215657 A1 Jul. 11, 2019

Related U.S. Application Data

(63) Continuation of application No. 15/795,859, filed on Oct. 27, 2017, now Pat. No. 10,278,019, which is a
(Continued)

(51) Int. Cl.
*H04W 4/02* (2018.01)
*H04B 17/318* (2015.01)
*H04L 12/24* (2006.01)

(52) U.S. Cl.
CPC .......... *H04W 4/023* (2013.01); *H04B 17/318* (2015.01); *H04L 41/0893* (2013.01)

(58) Field of Classification Search
CPC ....... G06F 9/4446; G06F 17/28; G10L 15/00; H04W 4/22; H04W 4/008; H04W 4/08;
(Continued)

(56) References Cited

U.S. PATENT DOCUMENTS 8,983,435 B2 3/2015 Weiss
9,344,846 B2 5/2016 Mondal et al.
(Continued)

FOREIGN PATENT DOCUMENTS

JP 5745670 7/2015

OTHER PUBLICATIONS

Mell et al., "The NIST Definition of Cloud Computing", NIST, Special Publication 800-145, Sep. 2011, 7 pages.
(Continued)

*Primary Examiner* — Phuoc H Doan
(74) *Attorney, Agent, or Firm* — Jay Wahlquist; Andrew D. Wright; Roberts Mlotkowski Safran Cole & Calderon P.C.

(57) ABSTRACT

A computer-implemented method includes: monitoring, by a computing device, respective locations of a plurality of user devices; determining, by the computing device, that a particular group of user devices of the plurality of user devices are located within a threshold distance of each other based on monitoring the respective locations of the plurality of user devices; and storing or outputting, by the computing device, grouping information indicating that the particular group of user devices are associated with a single user based on the determining that the particular group of user devices are located within a threshold distance of each other.

16 Claims, 12 Drawing Sheets

Related U.S. Application Data continuation of application No. 15/216,032, filed on Jul. 21, 2016, now Pat. No. 9,843,898.

(58) Field of Classification Search
CPC ...... H04W 4/027; H04W 88/04; H04L 51/02; H04M 1/72536; H04M 3/567
USPC ............ 715/706; 455/414.2, 456.6; 705/14.4
See application file for complete search history.

(56) References Cited

U.S. PATENT DOCUMENTS

| | | |
|---|---|---|
| 9,712,620 B2 | 7/2017 | Fleming et al. |
| 9,843,898 B1 | 12/2017 | Greenberger et al. |
| 10,278,019 B2 | 4/2019 | Greenberger et al. |
| 2008/0120362 A1 | 5/2008 | Kapoor et al. |
| 2008/0146205 A1* | 6/2008 | Aaron ................. H04M 3/4228 455/414.2 |
| 2013/0110623 A1 | 5/2013 | Kilroy et al. |
| 2015/0169336 A1* | 6/2015 | Harper .................... G10L 15/22 715/706 |
| 2018/0070207 A1 | 3/2018 | Greenberger et al. |

OTHER PUBLICATIONS

List of IBM Patents or Patent Applications Treated as Related, dated Mar. 18, 2019, 1 page.

"List of IBM Patents or Patent Applications Treated as Related", dated Nov. 13, 2019, 1 page.

* cited by examiner

ASSOCIATING MULTIPLE USER DEVICES WITH A SINGLE USER

BACKGROUND

The present invention generally relates to associating multiple user devices with a single user and, more particularly, to associating multiple user devices with a single user based on the proximity of the multiple user devices to each other.

Multiple different user devices, such as smartphones, tablets, wearable devices (e.g., smart watches, fitness bands, smart glasses, etc.) may be associated with a single individual or user. For example, the user may own a smartphones, tablet, and wearable device, and may have the multiple user devices in their possession at any given time.

SUMMARY

In an aspect of the invention, a computer-implemented method includes: monitoring, by a computing device, respective locations of a plurality of user devices; determining, by the computing device, that a particular group of user devices of the plurality of user devices are located within a threshold distance of each other based on monitoring the respective locations of the plurality of user devices; and storing or outputting, by the computing device, grouping information indicating that the particular group of user devices are associated with a single user based on the determining that the particular group of user devices are located within a threshold distance of each other.

In an aspect of the invention, there is a computer program product for grouping user devices. The computer program product comprising a computer readable storage medium having program instructions embodied therewith, the program instructions executable by a computing device to cause the computing device to: monitor respective locations of a plurality of user devices within a particular area; associate two or more of the plurality of user devices to a single user based on a proximity of the two or more of the plurality of user devices to each other; and store or output grouping information indicating that the two or more of the plurality of user devices are associated with a single user monitor respective locations of a plurality of user devices within a particular area; determine that two or more of the plurality of user devices remain within a threshold distance of each other for a threshold period of time based on the monitoring the respective locations of a plurality of user devices; determine that the two or more of the plurality of user devices are associated with a single user based on the determining that the two or more of the plurality of user devices remain within a threshold distance of each other for a threshold period of time; and store or output grouping information indicating that the two or more of the plurality of user devices are associated with a single user.

In an aspect of the invention, a system comprises: a CPU, a computer readable memory and a computer readable storage medium associated with a computing device; program instructions to monitor respective locations of a plurality of user devices within a particular area; program instructions to detect that two or more user devices of the plurality of user devices remain within a threshold distance of each other for a threshold period of time; program instructions to associate the two or more user devices of the plurality of user devices to a single user based on the detecting that the two or more user devices of the plurality of user devices remain within the threshold distance of each other for the threshold period of time; and program instructions to store or output grouping information indicating that the two or more of the plurality of user devices are associated with a single user. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
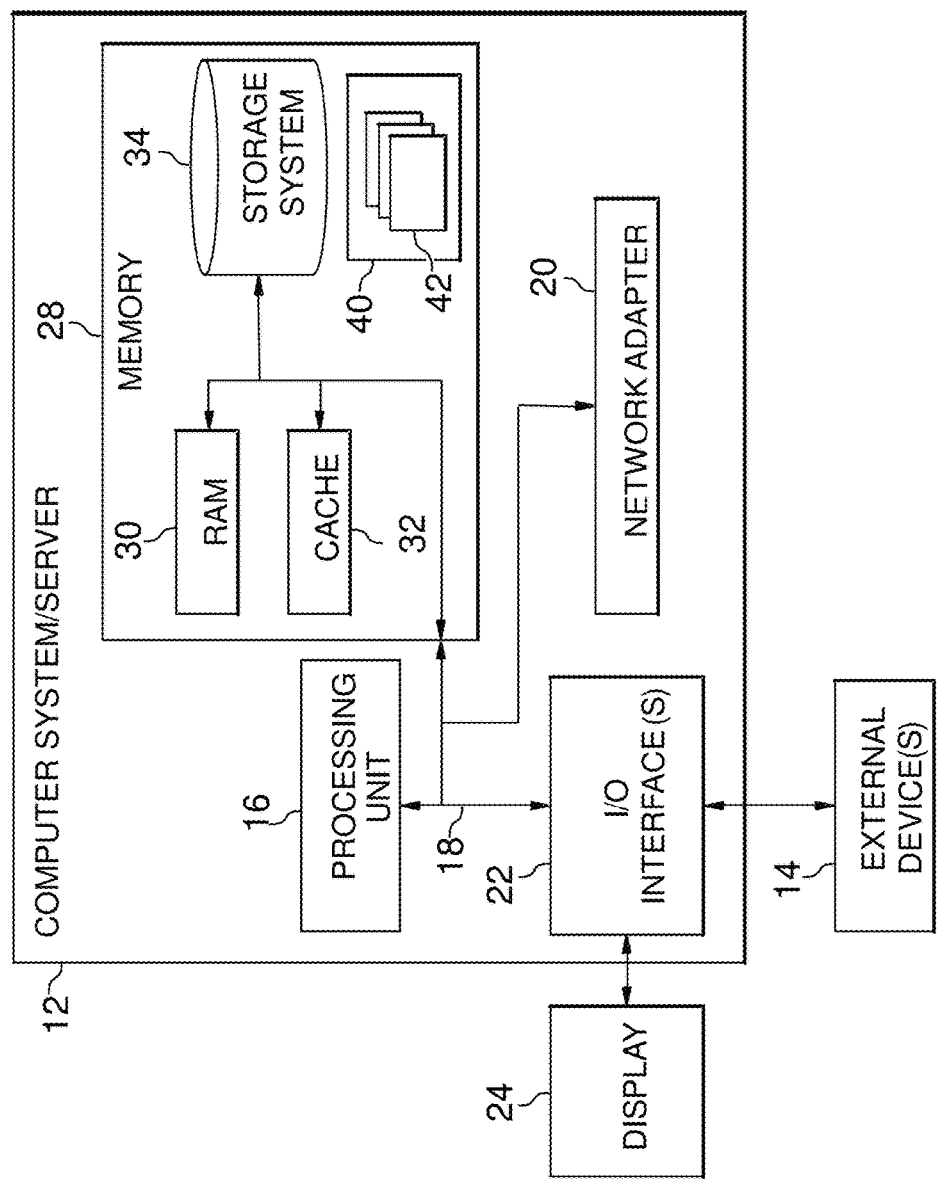
FIG. 1 depicts a cloud computing node according to an embodiment of the present invention.

The present invention generally relates to associating multiple user devices with a single user and, more particularly, to associating multiple user devices with a single user based on the proximity of the multiple user devices to each other. User devices may be individually detected based on various signals transmitted by the user devices (e.g., cellular signals, personal area network (PAN) signals, Bluetooth® signals, wireless local area network (WLAN) signals, global positioning system (GPS) signals, etc.). Detecting user devices may be useful for estimating the number of individuals currently present in a location (e.g., the number of individuals that have attended an event). Additionally, or alternatively, targeted content may be provided to user devices that are located in a particular area (e.g., promotions or other content relating to a particular area in which the user devices are located). As described herein, a single user may own a smartphone, tablet, and wearable device, and may have the multiple user devices in their possession at any given time. Thus, detecting only the number of user devices may inaccurately estimate the number of individuals in a particular location, since multiple user devices may be associated with a single individual. Further, providing content to multiple user devices that are associated with the same user can be a nuisance to the user, and may also unnecessarily waste network resources used to provide content to multiple user devices associated with the same user.

Aspects of the present invention may include systems and/or methods to associate multiple user devices with a single user based on the proximity of the user devices to each other. For example, aspects of the present invention may group multiple user devices together when the user devices are within a threshold distance of each other for a threshold period of time. Advantageously, multiple user devices may be grouped and associated with a single user to better estimate the number of users versus a number of user devices in a particular area at a particular time. Further, content may be provided only to a single user device within a group of user devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
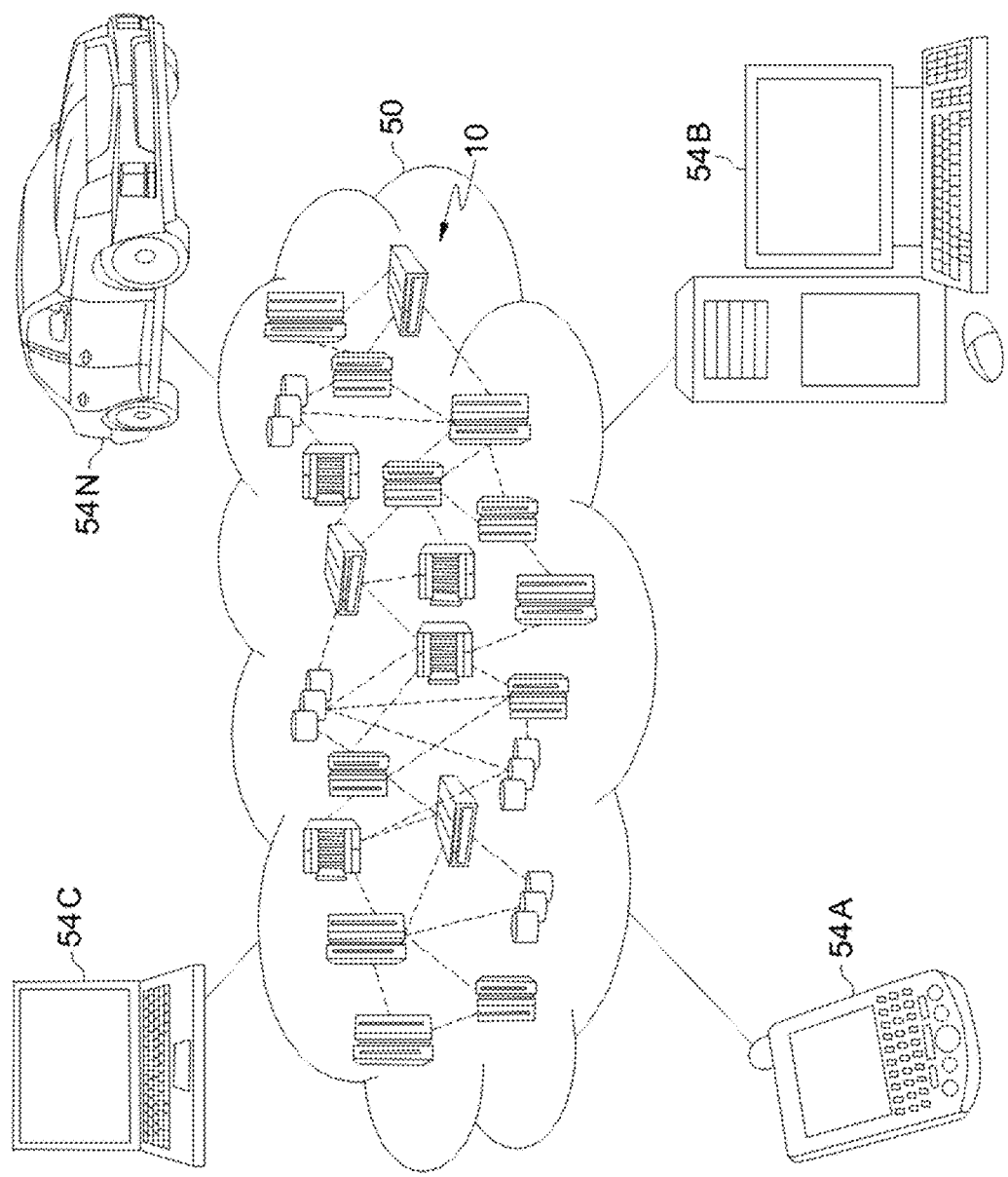
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
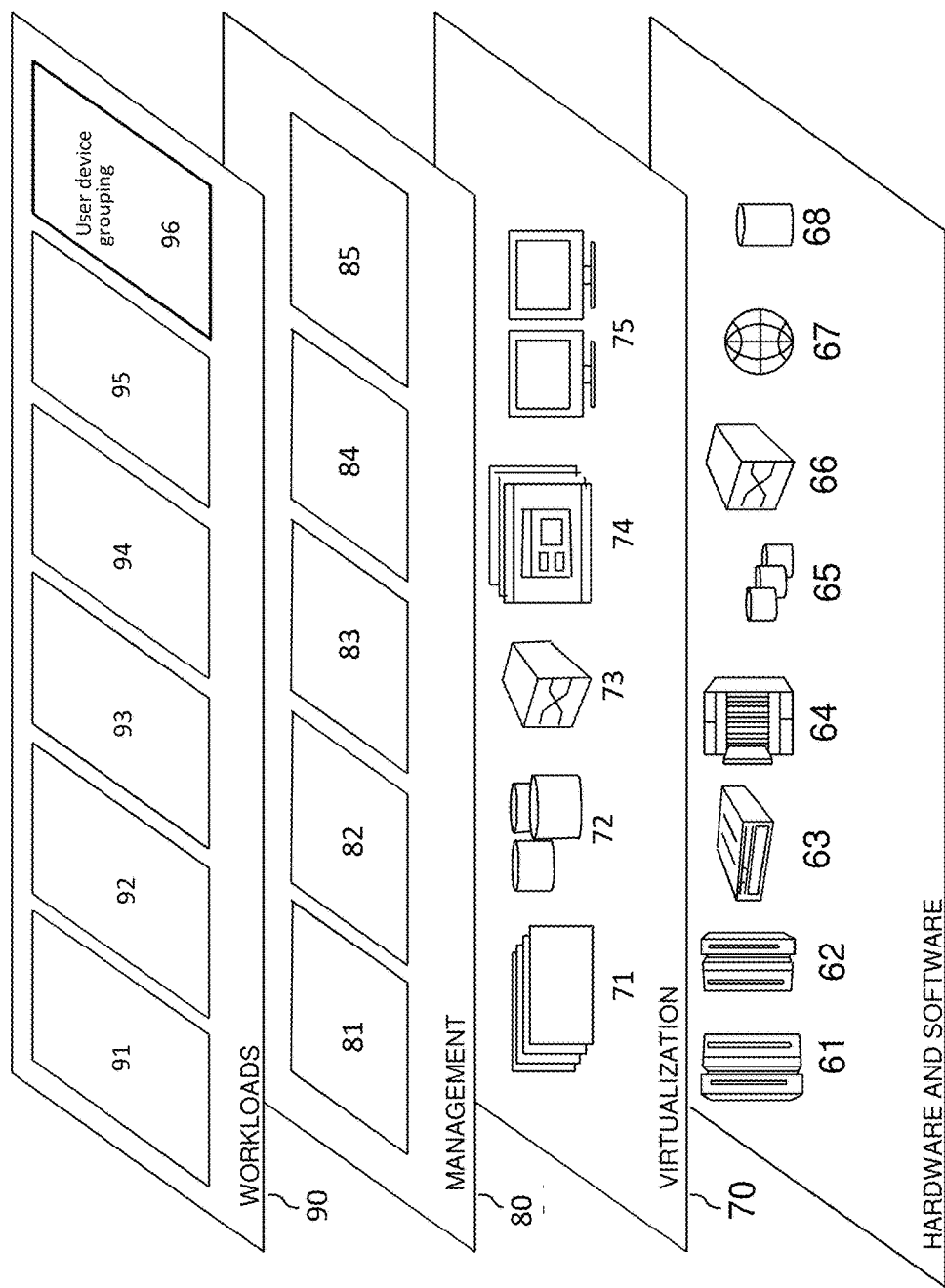
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user device grouping 96.

Referring back to FIG. 1, the program/utility 40 may include one or more program modules 42 that generally carry out the functions and/or methodologies of embodiments of the invention as described herein. For example, program modules 42 may perform the functions of user device grouping 96. Specifically, the program modules 42 may detect user devices within a particular area, monitor the location of the user devices while located within the particular area, and group user devices that are within a particular threshold distance of each other for a threshold period of time. Other functionalities of the program modules 42 are described further herein such that the program modules 42 are not limited to the functions described above. Moreover, it is noted that some of the modules 42 can be implemented within the infrastructure shown in FIGS. 1-3.

Figure 4A:
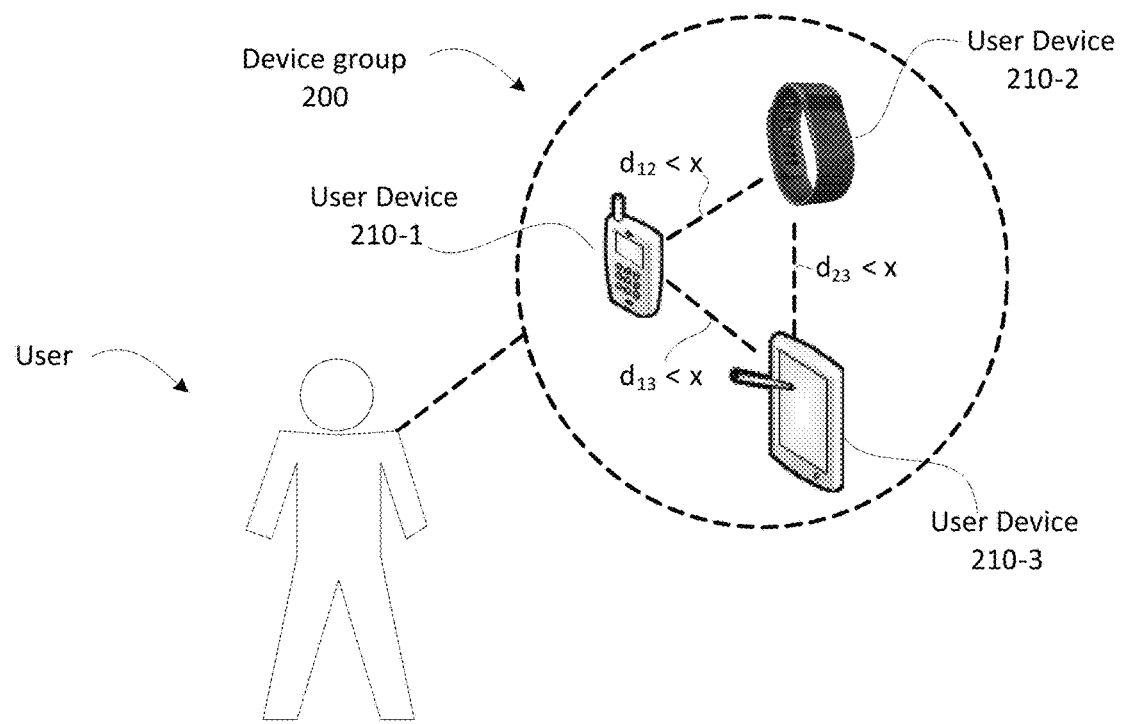
FIGS. 4A and 4B show an overview of an example implementation in accordance with aspects of the present invention.
Figure 4B:
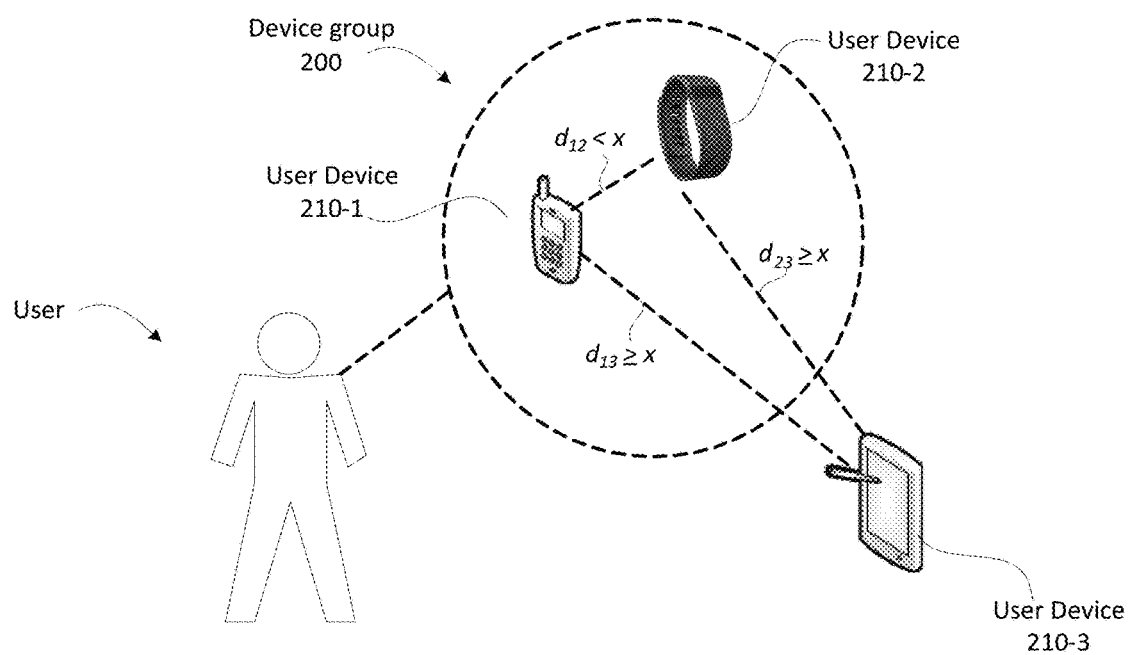

FIGS. 4A and 4B show an overview of an example implementation in accordance with aspects of the present invention. As shown in FIG. 4A, a user may be in possession of multiple different user devices (e.g., user device 210-1, user device 210-2, and user device 210-3, also referred to fsingularly as "user device 210" and collectively as "user devices 210"). Each user device 210 may include a device capable of communicating via a network. For example, each user device 210 may correspond to a mobile communication device (e.g., a smartphones or a personal digital assistant (PDA)), a portable computer device (e.g., a laptop or a tablet computer), a wearable computing device, and/or another type of device. As described herein, multiple different user devices 210 may be associated with a single user. The user devices 210 may connect with location information devices (e.g., using short-range communication techniques) in order for a "fine" location of the user devices 210 to be determined. Additionally, or alternatively, the user devices 210 may output broadcast or discovery signals that the location information devices may receive in order for the fine location of the user devices 210 to be determined, as described in greater detail herein.

In accordance with aspects of the present invention, a device group 200 may be formed for the multiple different user devices when the multiple different user devices are within a threshold distance of each other. For example, the user device 210-1, user device 210-2, and user device 210-3 may be grouped together when the distance between the user device 210-1 and the user device 210-2 (e.g., $d_{12}$) is less than a threshold distance (x), when the distance between the user device 210-1 and the user device 210-3 (e.g., $d_{13}$) is less than the threshold distance, and when the distance between the user device 210-2 and the user device 210-3 (e.g., $d_{23}$) is less than the threshold distance.

Referring to FIG. 4B, a device grouping 200 may include the user device 210-1 and the user device 210-2 but not the user device 210-3 when the distance between the user device 210-1 and the user device 210-2 is less than the threshold distance, but when the distance between the user device 210-1 and the user device 210-3 and/or the distance between the user device 210-2 and the user device 210-3 is greater than or equal to the threshold distance.

As described in greater detail herein, a device grouping server may group multiple user devices by storing information indicating that the multiple user devices are associated with a single user. Further, the device grouping server may monitor the "fine" location of the multiple user devices using any combination of device location techniques (e.g., beacon-based location determination, triangulation-based location determination, etc.). Based on monitoring the location of the multiple user devices, the device grouping server may identify that multiple user devices are associated with a single user when the multiple user devices are within a configurable threshold distance of each other for a configuration threshold period of time. In embodiments, the device grouping server may provide information that multiple user devices are associated with a single user (e.g., for the purposes of estimating the number of users in a location and/or to provide a user with content via a single device associated with the user).

Figure 5:
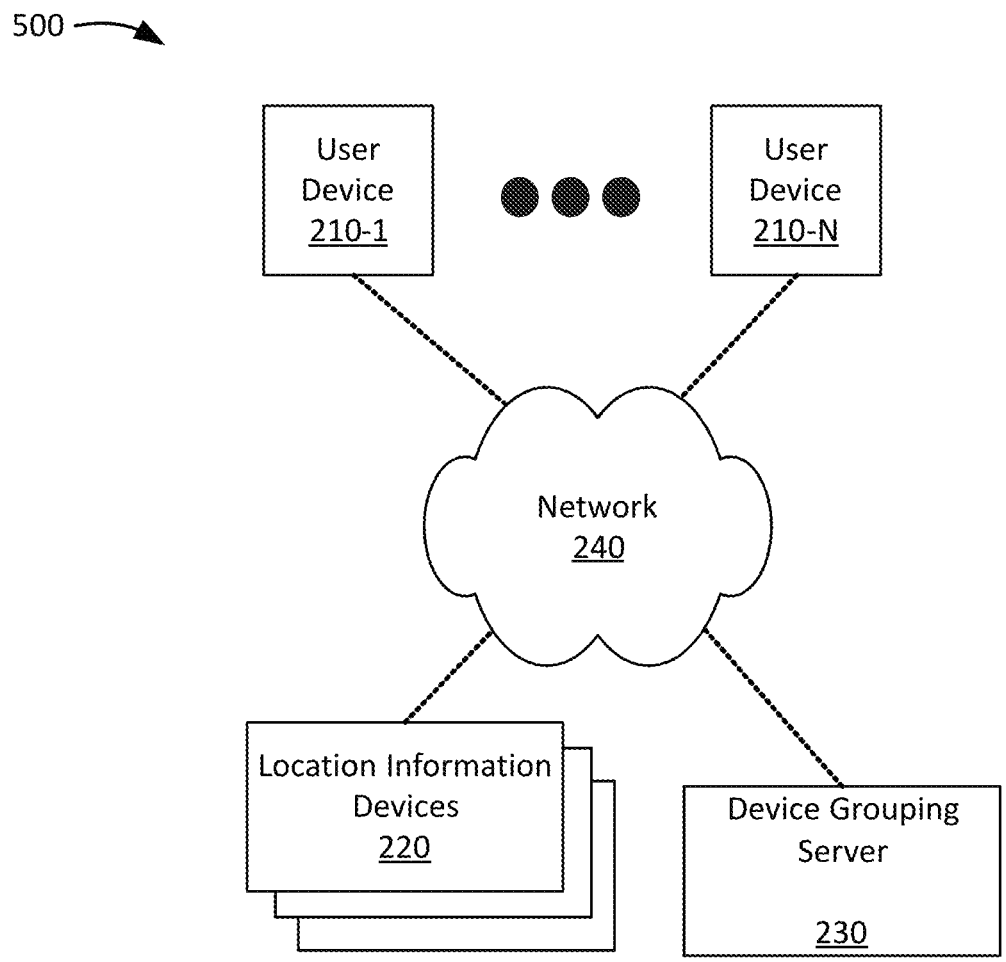
FIG. 5 shows an example environment in accordance with aspects of the present invention.

FIG. 5 shows an example environment in accordance with aspects of the present invention. As shown in FIG. 5, environment 500 may include user devices 210-1 through 210-N (where N is an integer greater than or equal to 2) and referred to individually as "user device 210" and collectively as "user devices 210", location information devices 220, a device grouping server 230, and/or a network 240. In embodiments, one or more components in environment 500 may correspond to one or more components in the cloud computing environment of FIG. 2.

The location information devices 220 may include one or more computing devices, such as beacons, network devices, or the like that may connect with the user device 210 via, for example, a WLAN, a WPAN, or the like. Additionally, or alternatively, the location information devices 220 may receive broadcast or discovery signals transmitted by the user device 210 without establishing a connection with the user device 210. The location information devices 220 may provide information regarding the location of user devices 210 to the device grouping server 230. For example, each location information device 220 may provide information regarding their own locations and signal strength information of a signal received from the user device 210. As described herein, the location information device 220 may provide identification information for the user device 210 (e.g., a Media Access Control (MAC) address of the user device 210, a device identifier, or the like). The location information devices 220 may be located in a particular location associated with a service provider that wishes to group multiple user devices 210 to a single user (e.g., to more accurately identify the number of users at the location, and/or to provide content to only a single user device associated with a user).

The device grouping server 230 may include one or more computing devices that may monitor the location of user devices 210, and group user devices 210 based on their distance to each other. In embodiments, the device grouping server 230 may include one or more of the components of computer system/server 12 of FIG. 1, such as program modules 42. In embodiments, the device grouping server 230 may receive location information for a user device 210 from the location information devices 220. From the location information, the device grouping server 230 may determine the fine location of the user device 210 using triangulation techniques and/or other location determination techniques.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
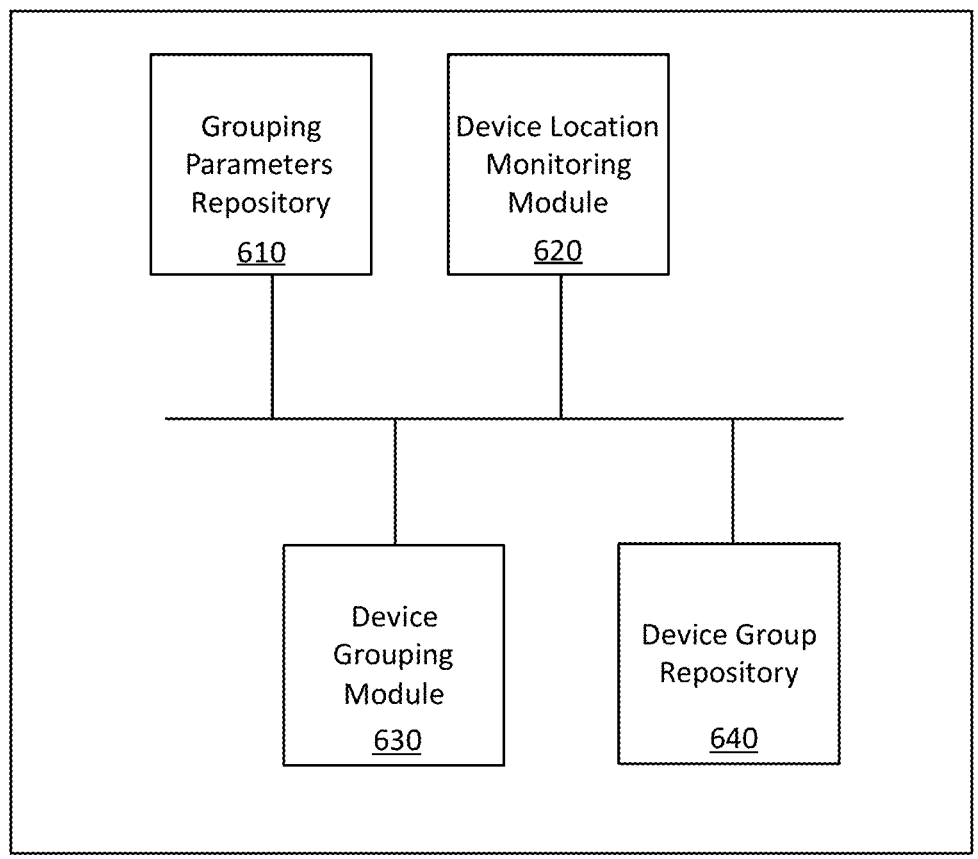
FIG. 6 shows a block diagram of example components of a device grouping server in accordance with aspects of the present invention.

FIG. 6 shows a block diagram of example components of a device grouping server in accordance with aspects of the present invention. As shown in FIG. 6, the device grouping server 230 may include grouping parameters repository 610, device location monitoring module 620, device grouping module 630, and device group repository 640. In embodiments, the device grouping server 230 may include additional or fewer components than those shown in FIG. 6. In embodiments, separate components may be integrated into a single computing component or module. Additionally, or alternatively, a single component may be implemented as multiple computing components or modules.

The grouping parameters repository 610 may include a data storage device (e.g., storage system 34 of FIG. 1) that stores information regarding parameters from which a group of user devices 210 is established. For example, the grouping parameters repository 610 may store information identifying a threshold distance within which multiple user devices 210 may be located in order for the multiple user devices 210 to be grouped to a single user. Additionally, or alternatively, the grouping parameters repository 610 may store information identifying a threshold time that the multiple user devices 210 may be located within the threshold distance of each other in order for the multiple user devices 210 to be grouped to a single user. In embodiments, the grouping parameters may be preconfigured and may be configurable and modified by an administrator of the device grouping server 230. In embodiments, a relatively larger threshold distance may be selected to reduce the chances that a device grouping does not erroneously omit a user device that is in fact associated with a particular user. A relatively smaller threshold distance may be selected to reduce the changes that a device grouping does not erroneously include a user device that is in fact not associated with a particular user.

The device location monitoring module 620 may include a program module (e.g., program module 42 of FIG. 1) that receives user device location information from the location information devices 220. In embodiments, the device location monitoring module 620 may detect that a particular group of user devices 210 have entered a particular area based on an initial receipt of user device location information identifying the group of user devices 210. The device location monitoring module 620 may use the user device location information to determine the fine locations of user devices 210 (e.g., using one or more triangulation and/or location determination techniques). The device location monitoring module 620 may continuously monitor the location of the user devices 210 based on the user device location information received from the location information devices 220.

The device grouping module 630 may include a program module (e.g., program module 42 of FIG. 1) that may group multiple user devices 210 to a single user (e.g., by storing information indicating that the multiple user devices 210 are associated with a single user). In embodiments, the device grouping module 630 may group multiple user devices 210 to a single user based on the information stored by the grouping parameters repository 610 and received by the device location monitoring module 620. For example, the device grouping module 630 may determine that multiple user devices 210 are within the threshold distance of each other for a threshold period of time (e.g., in which the threshold distance and the threshold time are stored by the grouping parameters repository 610). In embodiments, the device grouping module 630 may determine that the multiple user devices 210 are within the threshold distance of each other for a threshold period of time by tracking the distance between the user devices 210 at various time indexes.

The device group repository 640 may include a data storage device (e.g., storage system 34 of FIG. 1) that stores information regarding user device groupings. For example, the device grouping module 630 may store information indicating that the multiple user devices 210 are associated with a single user in the device group repository 640. In embodiments, information stored by the device group repository 640 may be provided to or accessible by other devices (e.g., for estimating the number of users in a location and/or providing content to a single user device associated with a user).

Figure 7A:
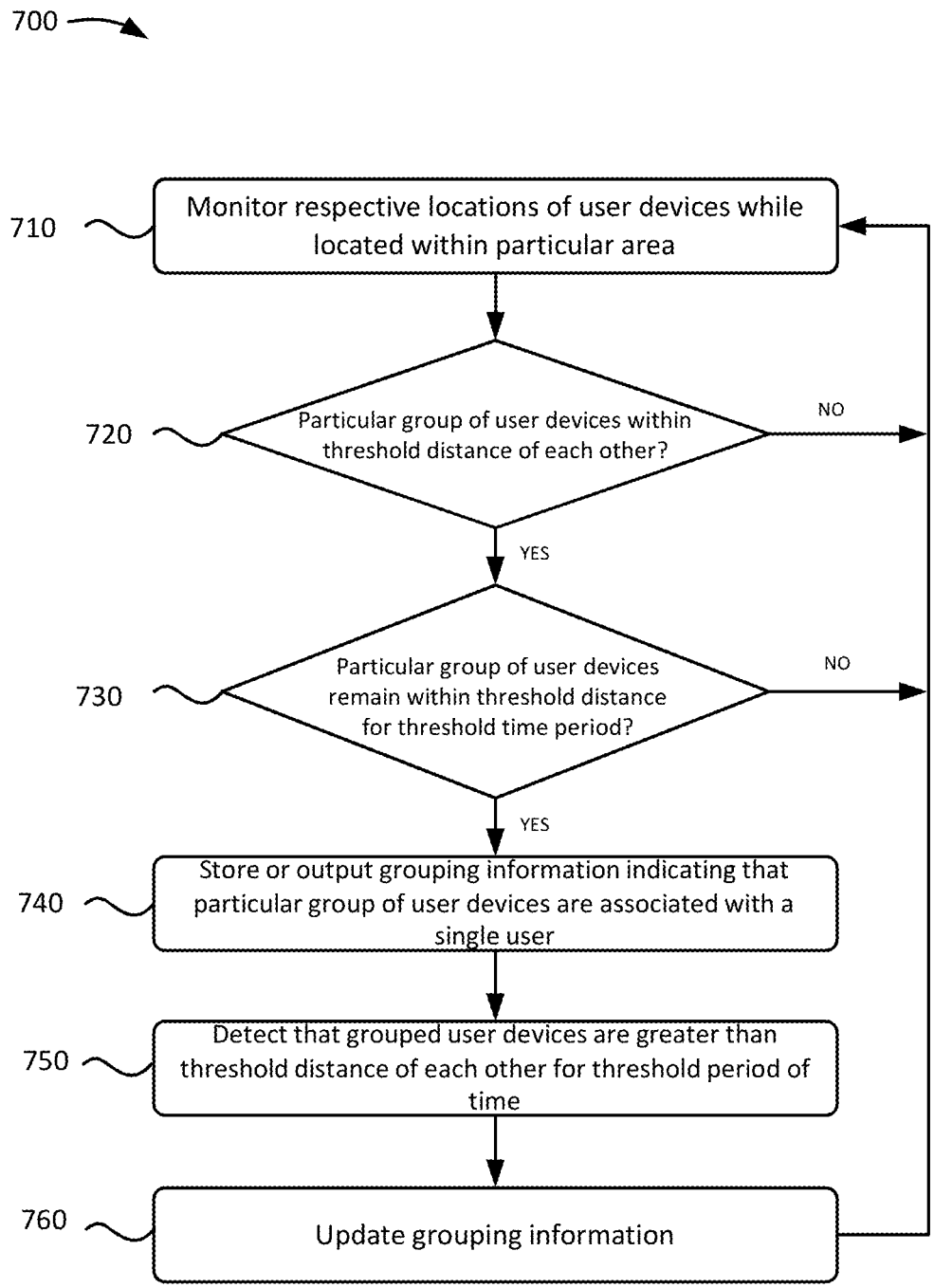
FIGS. 7A and 7B show an example flowchart for grouping multiple user devices to a particular user in accordance with aspects of the present invention.
Figure 7B:
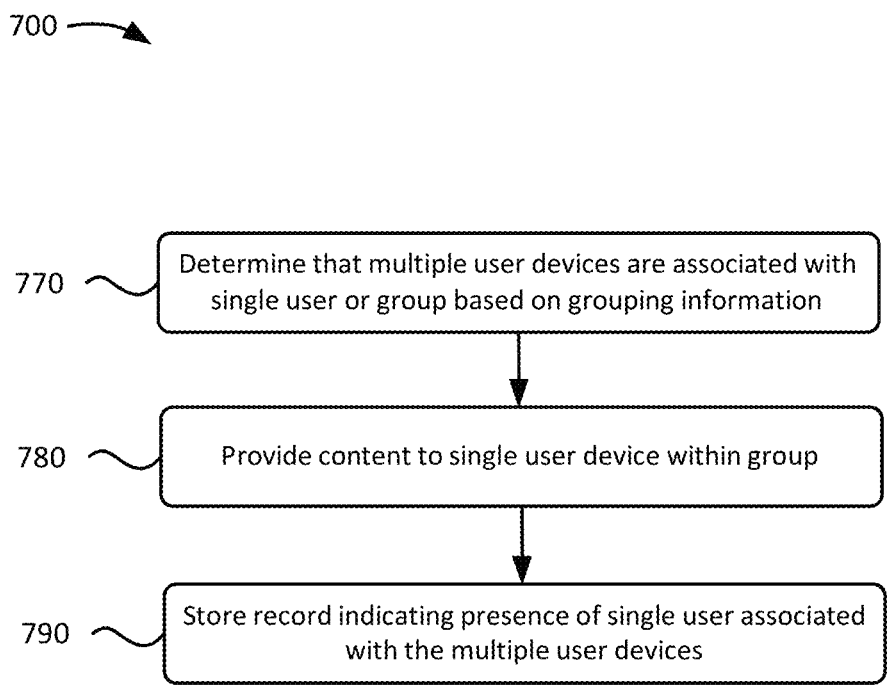

FIGS. 7A and 7B show example flowcharts for grouping multiple user devices to a particular user in accordance with aspects of the present invention. The steps of FIGS. 7A and 7B may be implemented in the environment of FIGS. 5 and 6, for example, and are described using reference numbers of elements depicted in FIGS. 5 and 6. As noted above, the flowcharts illustrates the architecture, functionality, and operation of possible implementations of systems, methods, and computer program products according to various embodiments of the present invention.

As shown in FIG. 7A, process 700 may include monitoring respective locations of user devices while located within a particular area (step 710). For example, as described above with respect to the device location monitoring module 620, the device grouping server 230 may monitor the locations of the user devices 210 while the user devices 210 are located within a particular area (e.g., a particular facility associated with the device grouping server 230). In embodiments, the device grouping server 230 may monitor the location of the user devices 210 based on receiving user device location information from the location information devices 220 implemented within the particular area. The device grouping server 230 may continuously receive the user device location information of a user device 210 until the user device 210 is no longer in the particular area and is no longer within a communications range of the location information devices 220.

In embodiments, the device grouping server 230 may use the user device location information to determine the fine locations of user devices 210 (e.g., using one or more triangulation and/or location determination techniques). Further, the device grouping server 230 may track the distance between user devices 210 at various time indexes. As described in greater detail below with respect to FIG. 8, the device grouping server 230 may store information identifying the distance between user devices 210 at various time indexes in a table. As described herein, the information identifying the distance between user devices 210 at various time indexes may be used to group one or more user devices 210 together. Further, the information identifying the distance between user devices 210 at various time indexes may be used to ungroup previously grouped user devices 210. As described herein, step 710 may be ongoing throughout process 700. More specifically, the device grouping server 230 may continue to monitor the location of user devices 210 within the particular area, and track the distance between the user devices 210 at various time indexes.

Process 700 may further include determining whether a particular group of user devices are within a threshold distance of each other (step 720). For example, device grouping server 230 may determine whether a particular group (e.g., a pair) of user devices 210 are within a threshold distance of each other (e.g., based on the monitoring of user device locations and tracking the distance between the user devices 210). More specifically, device grouping server 230 may identify the distance between a particular pair of user devices 210, and determine whether the distance between the pair of user devices 210 is within the threshold distance. If, at step 720, the particular group of user devices 210 are not within the threshold distance of each other, process 700 may return to step 710 in which device grouping server 230 may continue to monitor the location of user devices 210 within the particular area, and determine whether the distance between user devices 210 in another group (e.g., another pair) is within the threshold distance (step 720).

If, at step 720, the particular group of user devices 210 are within a threshold distance of each other, process 700 may include determining whether the particular group of user devices 210 remain within the threshold distance for a threshold period of time (step 730). For example, as described above with respect to the device grouping module 630, the device grouping server 230 may track the distance between two or more user devices 210 at various time indexes. In embodiments, the device grouping server 230 may begin a timer when the two or more user devices 210 are within the threshold distance of each other. If the user devices 210 are not within the threshold distance of each other for a threshold period of time (e.g., if the user device 210 separate to greater than the threshold distance before the threshold period of time has elapsed), process 700 may return to step 710 in which device grouping server 230 may continue to monitor the location of user devices 210 within the particular area.

If, on the other hand, the user devices 210 are within the threshold distance of each other for the threshold period of time, process 700 may include storing or outputting grouping information indicating that the user devices 210 are associated with a single user (step 740). For example, as described above with respect to the device grouping module 630 and 640, the device grouping server 230 may group the user devices 210 by storing grouping information indicating that the multiple user devices 210 are associated with a single user (or group) in the device group repository 640. In embodiments, grouping information stored by the device group repository 640 may be provided to or accessible by other devices (e.g., for estimating the number of users in a location and/or providing content to a single user device 210 associated with a user). In embodiments, the user device 210 to which the content is provided may be based on the type of content and the type of user device 210 (e.g., certain types of content may be provided to a smart watch whereas other types of content may be provided to a tablet). In embodiments, the device grouping server 230 may provide the content to the single user device 210 (e.g., without outputting content to other user devices 210 associated with the user).

Process 700 may further include detecting that grouped user devices are greater than a threshold distance of each other for a threshold period of time (step 750). For example, the device grouping server 230 may detect that the grouped user devices 210 are greater than a threshold distance of each other for a threshold period of time based on continued monitoring and tracking of the grouped user devices. Process 700 may also include updating the grouping information (step 760). For example, the device grouping server 230 may update grouping information to indicate that the previously grouped user devices 210 are no longer associated with the single individual. Updating the grouping information may be beneficial in a situation in which user devices 210 associated with different users are initially erroneously grouped (e.g., when two different users are walking relatively closely together) and the separation of the user devices 210 indicates that the user devices 210 are instead associated with different users.

Referring to FIG. 7B, process 700 may also include determining that multiple user devices are associated with a single user or group based on the grouping information (step 770). For example, the device grouping server 230 may determine that multiple user devices 210 in a particular area are associated with a single user or group. In embodiments, the device grouping server 230 may obtain identifiers for the multiple user devices 210 (e.g., from the location information devices 220), and lookup the identifiers in the grouping information to determine that the multiple user devices 210 are associated with a single user or group.

Process 700 may further include providing content to a single user device 210 within the group (step 780). For example, the device grouping server 230 may provide content (e.g., targeted content, such as advertising, etc.) to a single user device 210 within the group without providing the content to all of the user devices 210. In this way, content is received only once by the user associated with the multiple user devices 210. In embodiments, content may be provided to a particular user device 210 in the group based on the type of user device 210.

Process 700 may also include storing a record indicating the presence of a single user associated with the multiple user devices (790). For example, the device grouping server 230 may store a record indicating the presence of a single user associated with the multiple user devices 210. In this way, multiple user devices 210 are not counted multiple times when estimating the number of individuals present in an area.

Figure 8:
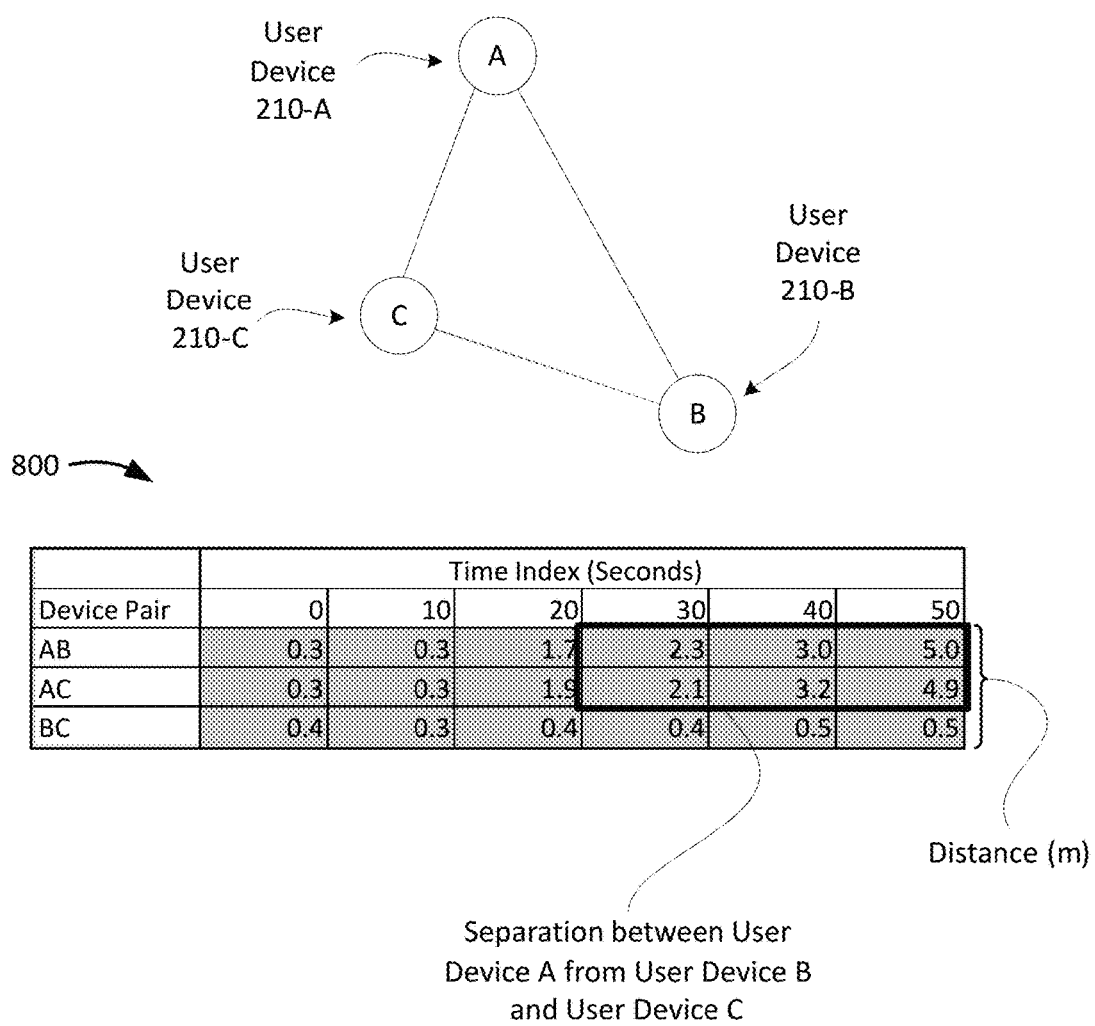
FIG. 8 shows an example data structure that stores information identifying distances between user devices at various time indexes in accordance with aspects of the present invention.

FIG. 8 shows an example data structure that stores information identifying distances between user devices at various time indexes in accordance with aspects of the present invention. The data structure may be stored by the device grouping server 230. As shown in FIG. 8, a data structure 800 may store information identifying distances between user devices 210-A, 210-B, and 210-C at different time indexes (e.g., 0 seconds, 10 seconds, 20 seconds, 30 seconds, 40 seconds, 50 seconds, and so on). User devices 210-A, 210-B, and 210-C may correspond to the user devices of FIG. 5. Each row in the data structure 800 may identify a distance between user devices in a device pair at different time indexes (e.g., the row with device pair "AB" indicates the distance between user devices 210-A and 210-B at different time indexes). As described herein, the information stored by the data structure 800 may be based on monitoring and tracking the location of the user devices 210-A, 210-B, and 210-C in accordance with the processes described herein.

In the example shown, the data structure 800 identifies a distance of 0.3 meters (m) between user devices 210-A and 210-B at time index 0 seconds, a distance of 0.3 meters at time index 10 seconds, a distance of 1.7 meters at time index 20 seconds, a distance of 2.3 meters at time index 30 seconds, a distance of 3.0 meters at time index 40 seconds, and a distance of 5.0 meters at time index 50 seconds. Similarly, the data structure 800 identifies a distance of 0.3 meters between user devices 210-A and 210-C at time index 0 seconds, a distance of 0.3 meters at time index 10 seconds, a distance of 1.9 meters at time index 20 seconds, a distance of 2.1 meters at time index 30 seconds, a distance of 3.2 meters at time index 40 seconds, and a distance of 4.9 meters at time index 50 seconds. Further, the data structure 800 identifies a distance of 0.4 meters between user devices 210-C and 210-C at time index 0 seconds, a distance of 0.3 meters at time index 10 seconds, a distance of 0.4 meters at time index 20 seconds, a distance of 0.4 meters at time index 30 seconds, a distance of 0.5 meters at time index 40 seconds, and a distance of 0.5 meters at time index 50 seconds.

Based on the information stored by the data structure 800, an initial device grouping may be formed to include user devices 210-A, 210-B, and 210-C since these user devices are within a threshold distance of each other (e.g., 2.0 meters) for a threshold time (e.g., 10 seconds). The device grouping may be updated to remove user device 210-A from the device grouping since the distance of user device 210-A from user device 210-B and 210-C exceeds a threshold distance (e.g., 2.0 meters) for a threshold period of time (e.g., 20 seconds). For example, the device grouping may be updated when the information in the data structure 800 indicates that user device 210-A separates from user devices 210-B and 210-C.

Figure 9A:
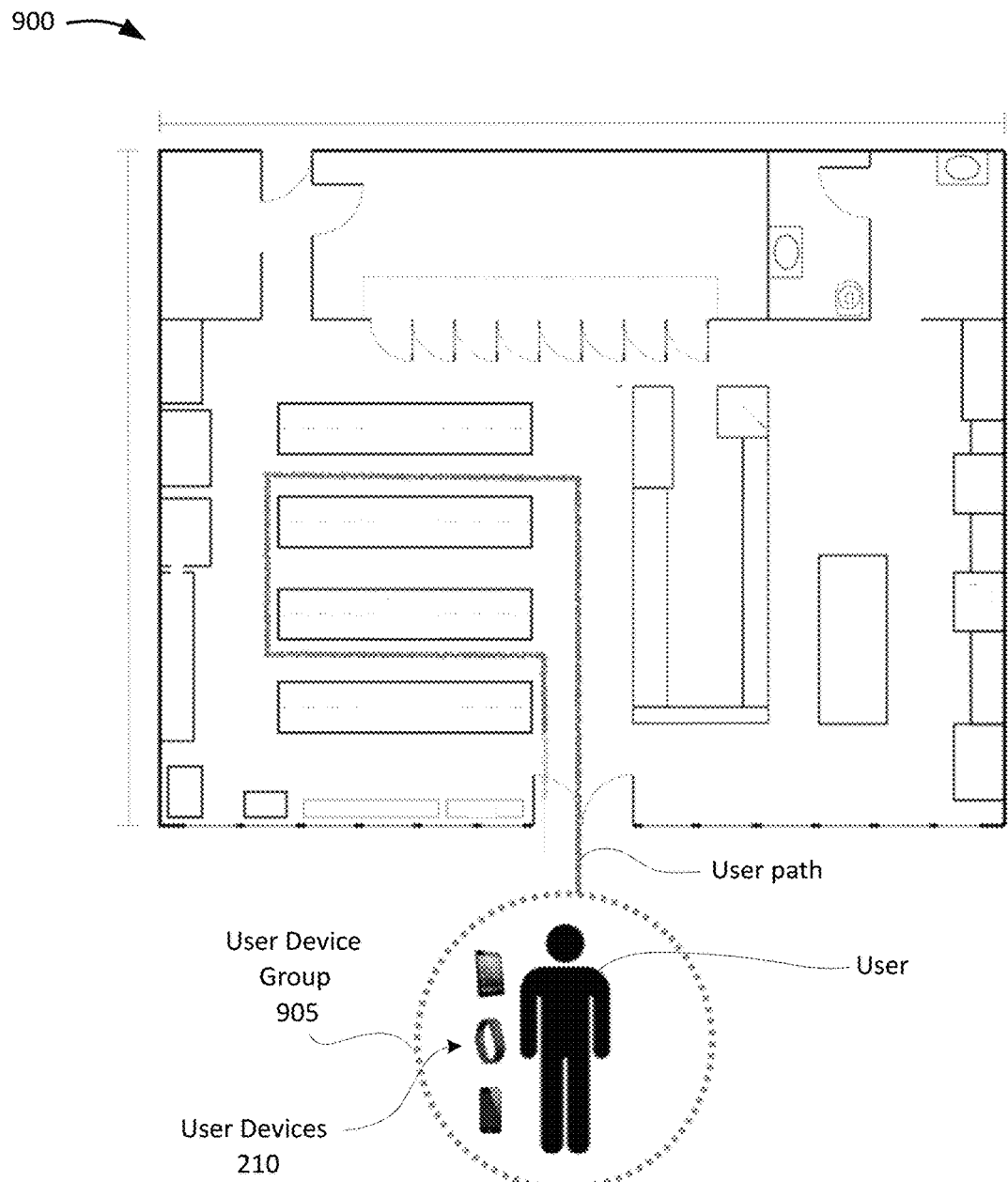
FIGS. 9A and 9B show example implementations for grouping user devices in accordance with aspects of the present invention.
Figure 9B:
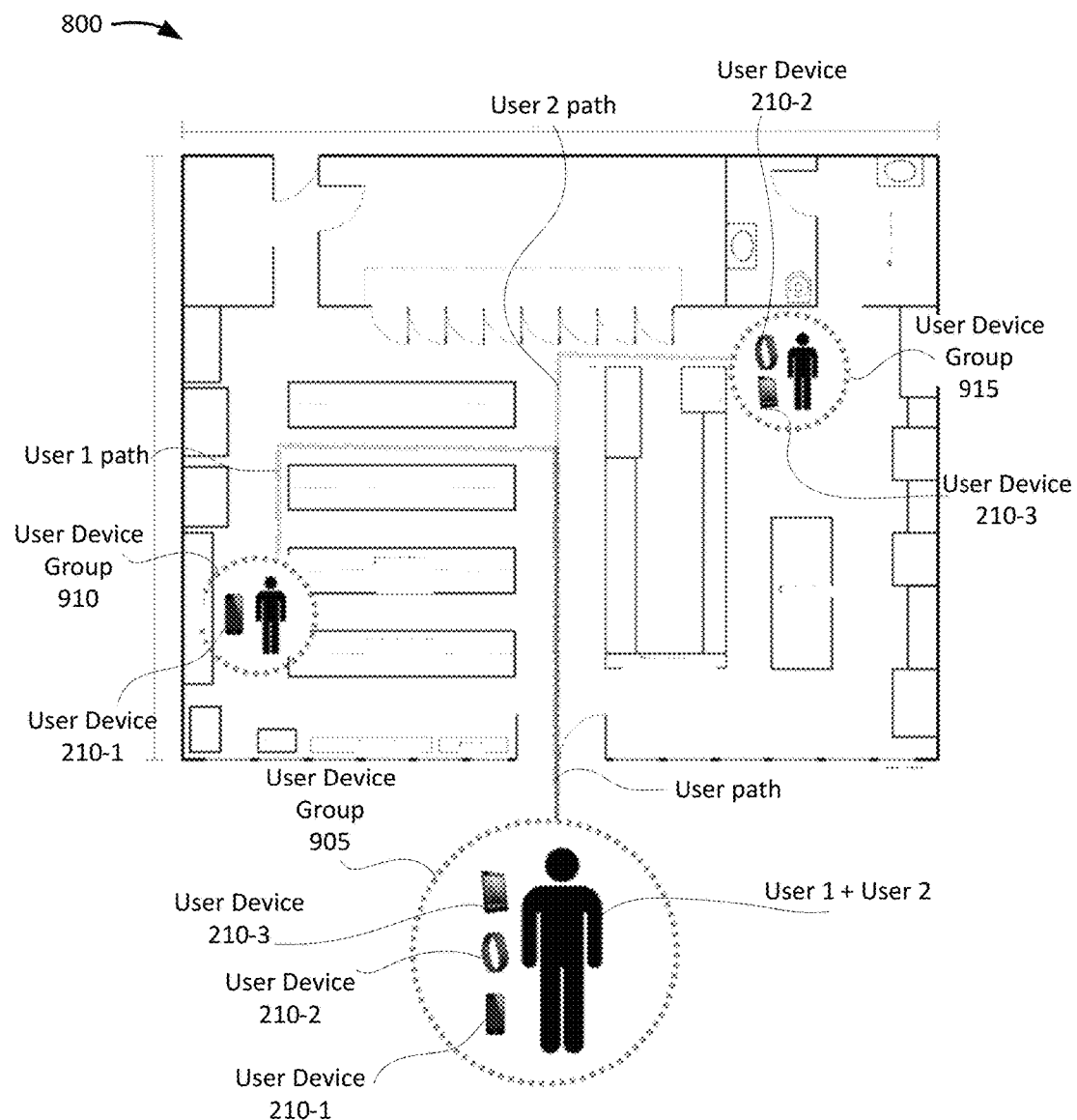

FIGS. 9A and 9B show example implementations for grouping user devices in accordance with aspects of the present invention. As shown in FIG. 9A, user devices 210 may be grouped to a user device group 905 associated with a particular user (e.g., when the user carries the user devices 210). For example, the user devices 210 may be grouped as the user walks along a path within a facility 900 and when the user devices 210 are within a threshold distance of each other for a threshold period of time as described herein. Referring to FIG. 9B, user devices 210-1, 210-2, and 210-3 may be grouped to the user device group 905 since the user devices 210-1, 210-2, and 210-3 are within a threshold distance of each other for a threshold period of time as described herein. However, the user device group 905 may be updated when certain user devices are no longer within a threshold distance of each other. For example, the initial grouping of user device group 905 may be made when two users (e.g., user 1 and user 2) are relatively close to one another. When the users separate, the user device group is updated (e.g., as shown by user device group 910 and user device group 915). In this way, user device groups may be updated based on device location information indicating that initially grouped user devices are in fact associated with different users.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
monitoring, by a computing device, respective locations of a plurality of user devices;
determining, by the computing device, that a particular group of user devices of the plurality of user devices are located within a threshold distance of each other based on monitoring the respective locations of the plurality of user devices;
storing, by the computing device, grouping information indicating that the particular group of user devices are associated with a single user based on the determining that the particular group of user devices are located within a threshold distance of each other;
outputting content to a single user device of the particular group of user devices;
detecting that the distance between user devices in the particular group of user devices is greater than the threshold distance for a threshold period of time; and
updating the grouping information to indicate that the particular group of user devices are no longer associated with the single user based on the detecting that the distance between user devices in the particular group of user devices is greater than the threshold distance, wherein the updating of the grouping information is further based on the detecting that the distance between user devices in the particular group of user devices is greater than the threshold distance for a threshold period of time.

2. The method of claim 1, further comprising determining that the particular group of user devices are located within the threshold distance of each other for a threshold period of time, wherein the storing or outputting the grouping information is further based on determining that the particular group of user devices are located within the threshold distance of each other for a threshold period of time.

3. The method of claim 2, further comprising storing information identifying a distance between the plurality of user devices at different time indexes, wherein the determining that the particular group of user devices are located within the threshold distance of each other for a threshold period of time is based on the stored information identifying a distance between the plurality of user devices at different time indexes.

4. The method of claim 1, wherein the monitoring the respective locations of the plurality of user devices includes receiving location information for the plurality of user devices from one or more location information devices.

5. The method of claim 4, wherein the one or more location information devices includes a beacon.

6. The method of claim 4, wherein:

the location information includes location information for the one or more location information devices and signal strength information for signals received by the one or more location information devices from a particular one of the plurality of user devices, and monitoring the location for the particular one of the plurality of user devices includes determining the location for the particular one of the plurality of user devices based on the location information for the one or more location information devices and the signal strength information for signals received by the one or more location information devices.

7. The method of claim 1, wherein a service provider at least one of creates, maintains, deploys and supports the computing device.

8. The method of claim 1, wherein steps of claim 1 are provided by a service provider on a subscription, advertising, and/or fee basis.

9. The method of claim 1, wherein the computing device includes software provided as a service in a cloud environment.

10. The method of claim 1, further comprising deploying a system for grouping user devices by providing a computer infrastructure operable to perform the steps of claim 1.

11. The method of claim 1, further comprising providing content to a single user device within the particular group of user devices without providing the content to other user devices within the particular group of user devices.

12. A system comprising:

a CPU, a computer readable memory and a computer readable storage medium associated with a computing device;

program instructions to monitor respective locations of a plurality of user devices within a particular area;

program instructions to detect that two or more user devices of the plurality of user devices remain within a threshold distance of each other for a threshold period of time;

program instructions to associate the two or more user devices of the plurality of user devices to a single user based on the detecting that the two or more user devices of the plurality of user devices remain within the threshold distance of each other for the threshold period of time;

program instructions to store grouping information indicating that the two or more of the plurality of user devices are associated with a single user;

program instructions to output content to a single user device of the particular group of user devices, program instructions to detect that the distance between the two or more user devices is greater than the threshold distance; and program instructions to update the grouping information to indicate that the two or more user devices are no longer associated with the single user based on the detecting that the distance between the two or more user devices is greater than the threshold distance, wherein the program instructions are stored on the computer readable storage medium for execution by the CPU via the computer readable memory.

13. The system of claim 12, further comprising program instructions to store information identifying a distance between the two or more of the plurality of user devices at different time indexes, wherein the determining that the two or more of the plurality of user devices are located within the threshold distance of each other for a threshold period of time is based on the stored information identifying a distance between the two or more of the plurality of user devices at different time indexes.

14. The system of claim 12, further comprising program instructions to output content to a single user device of the particular group of user devices without outputting the content to other user devices of the particular group of user devices.

15. The system of claim 12, wherein the monitoring the respective locations of the plurality of user devices includes receiving location information for the plurality of user devices from one or more location information devices.

16. The system of claim 12, further comprising program instructions to provide content to a single user device within the particular group of user devices without providing the content to other user devices within the particular group of user devices.

* * * * *